(12) United States Patent
Wilmot et al.

(10) Patent No.: US 10,738,805 B2
(45) Date of Patent: Aug. 11, 2020

(54) VENTED PRESSURIZED GAS-POWERED ACTUATOR

(71) Applicant: Joyson Safety Systems Acquisition LLC, Auburn Hills, MI (US)

(72) Inventors: Larry Wilmot, Oxford, MI (US); Rachid Hammoud, Windsor (CA)

(73) Assignee: Joyson Safety Systems Acquisition LLC, Auburn Hills, MI (US)

(*) Notice: Subject to any disclaimer, the term of this patent is extended or adjusted under 35 U.S.C. 154(b) by 0 days.

(21) Appl. No.: 14/299,573

(22) Filed: Jun. 9, 2014

(65) Prior Publication Data

US 2014/0360350 A1    Dec. 11, 2014

Related U.S. Application Data

(60) Provisional application No. 61/835,515, filed on Jun. 14, 2013, provisional application No. 61/832,538, filed on Jun. 7, 2013.

(51) Int. Cl.

| | |
|---|---|
| *F15B 21/04* | (2019.01) |
| *F15B 21/044* | (2019.01) |
| *F15B 15/14* | (2006.01) |
| *F15B 15/19* | (2006.01) |
| *B60R 21/38* | (2011.01) |

(52) U.S. Cl.
CPC .......... *F15B 21/044* (2013.01); *F15B 15/149* (2013.01); *B60R 21/38* (2013.01); *F15B 15/1428* (2013.01); *F15B 15/19* (2013.01)

(58) Field of Classification Search
CPC .... F16J 10/02; F16F 9/34; F16F 9/185; F16F 9/346; F15B 15/149; F15B 21/044; F15B 15/1428; F15B 15/19

USPC .............................................. 60/635; 91/402
See application file for complete search history.

(56) References Cited

U.S. PATENT DOCUMENTS

| | | | |
|---|---|---|---|
| 1,417,922 A | | 5/1922 | Koch |
| 3,171,361 A | | 3/1965 | Boulet .......................... 103/162 |
| 4,166,522 A | * | 9/1979 | Bourcier de Carbon .................... F16F 9/346 188/287 |
| 5,797,593 A | * | 8/1998 | Oyaizu ................. F16F 9/3465 188/322.17 |

(Continued)

FOREIGN PATENT DOCUMENTS

| | | |
|---|---|---|
| CN | 101790647 A | 7/2010 |
| DE | 2940570 A1 | 4/1981 |

(Continued)

OTHER PUBLICATIONS

U.S. Appl. No. 14/299,804, filed Jun. 9, 2014, issued on Aug. 22, 2017 as U.S. Pat. No. 9,739,294.

(Continued)

*Primary Examiner* — Abiy Teka
(74) *Attorney, Agent, or Firm* — Meunier Carlin & Curfman LLC

(57) ABSTRACT

A vented pressurized gas-powered actuator includes a housing having a central longitudinal axis and an inner surface. The inner surface has a constant radius between first and second planes extending perpendicular to the axis. At least one vent groove extends from the inner surface in a direction away from the axis. The at least one vent groove has a first end intersecting the first plane and a second end intersecting the second plane.

14 Claims, 12 Drawing Sheets

(56) References Cited

U.S. PATENT DOCUMENTS

| | | | |
|---|---|---|---|
| 5,961,102 A | 10/1999 | Oyaizu | |
| 5,971,117 A * | 10/1999 | Grundei | F16F 9/346 188/284 |
| 6,568,184 B2 | 5/2003 | Blackburn et al. | |
| 6,672,194 B2 | 1/2004 | Daoud | |
| 8,141,671 B2 | 3/2012 | Aoki et al. | |
| 8,549,975 B2 | 10/2013 | Schaefer Joachim et al. | |
| 2003/0227213 A1 | 12/2003 | Yamaguchi et al. | |
| 2005/0000352 A1* | 1/2005 | Yamaguchi et al. | 92/169.1 |
| 2010/0089048 A1 | 4/2010 | Schaefer | |
| 2011/0266801 A1* | 11/2011 | Sainio | 290/48 |
| 2012/0255432 A1 | 11/2012 | Harper et al. | 91/405 |

FOREIGN PATENT DOCUMENTS

| | | | | |
|---|---|---|---|---|
| DE | 3326275 A1 * | 2/1984 | | F16F 9/346 |
| DE | 102005058515 | 6/2007 | | |
| DE | 102011106513 | 12/2012 | | |
| EP | 0852303 A1 * | 7/1998 | | F16F 9/0209 |
| JP | S47014584 | 8/1972 | | |
| JP | S50072082 | 12/1976 | | |
| JP | 61142932 | 6/1986 | | |
| JP | 2005024010 | 1/2005 | | |
| JP | 2007192405 | 8/2007 | | |
| JP | 2009079761 | 4/2009 | | |
| JP | 2009513907 | 4/2009 | | |
| JP | 2010030496 A | 2/2010 | | |

OTHER PUBLICATIONS

Office Action dated Apr. 14, 2015 issued in U.S. Appl. No. 14/299,804.
Office Action dated Aug. 19, 2015 issued in U.S. Appl. No. 14/299,804.
Examiner's Answer to Appeal Brief dated Aug. 24, 2016 issued in U.S. Appl. No. 14/299,804.
Office Action dated Nov. 21, 2016 issued in U.S. Appl. No. 14/299,804.
Office Action dated Aug. 3, 2016 issued in related CN Application No. 201480032581.5.
International Preliminary Report on Patentability, dated Jun. 5, 2015 in International Patent Application No. PCT/US2014/41547.
International Preliminary Report on Patentability, dated Apr. 15, 2015 in International Patent Application No. PCT/US2014/41559.
International Preliminary Report on Patentability, dated Jun. 5, 2015 in International Patent Application No. PCT/US2014/41538.
U.S. Appl. No. 14/299,677, filed Jun. 9, 2014 issued on May 23, 2017 as U.S. Pat. No. 9,657,755.
Office Action dated Jun. 7, 2016 issued in U.S. Appl. No. 14/299,677.
Office Action dated Nov. 1, 2016 issued in U.S. Appl. No. 14/299,677.
Office Action dated May 31, 2017 issued in related CN Application No. 201480032581.5.
Office Action dated Sep. 29, 2017 in CN Application No. 201480032547.8.
Office Action dated Jul. 18, 2017 in JP Application No. 2016-518062.
Japanese Decision to Grant, dated Jul. 23, 2018, in connection with Japanese Patent Application No. 2016-518062.
English translation of Japanese Office Action issued in JP 2016-518061, dated Mar. 13, 2018.
Office Action, in connection with Application No. DE112014002684.0, dated Apr. 3, 2019.

* cited by examiner

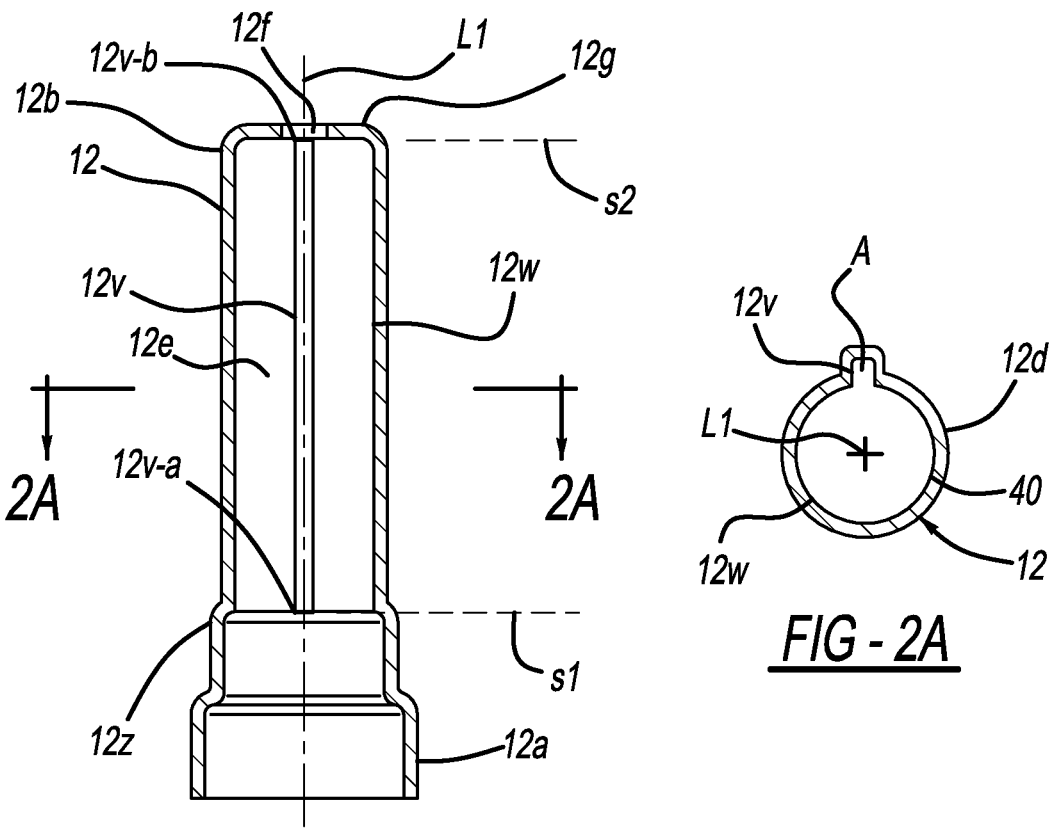
FIG - 2
FIG - 2A
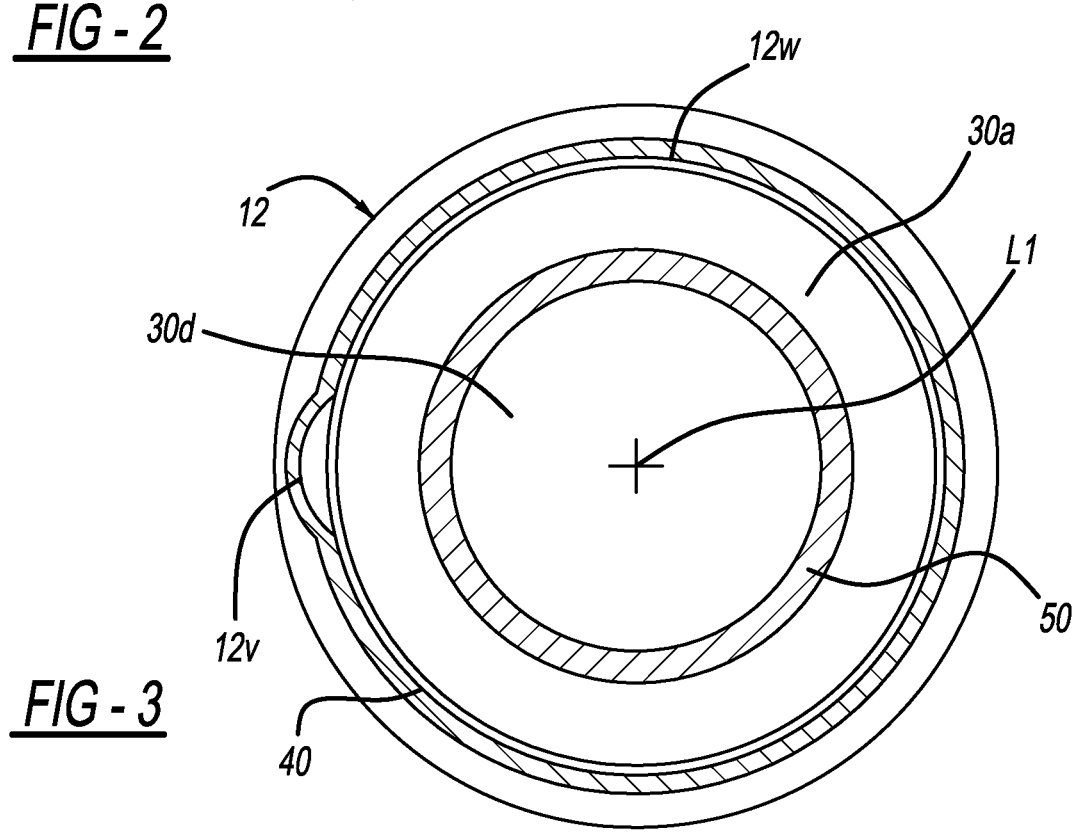
FIG - 3

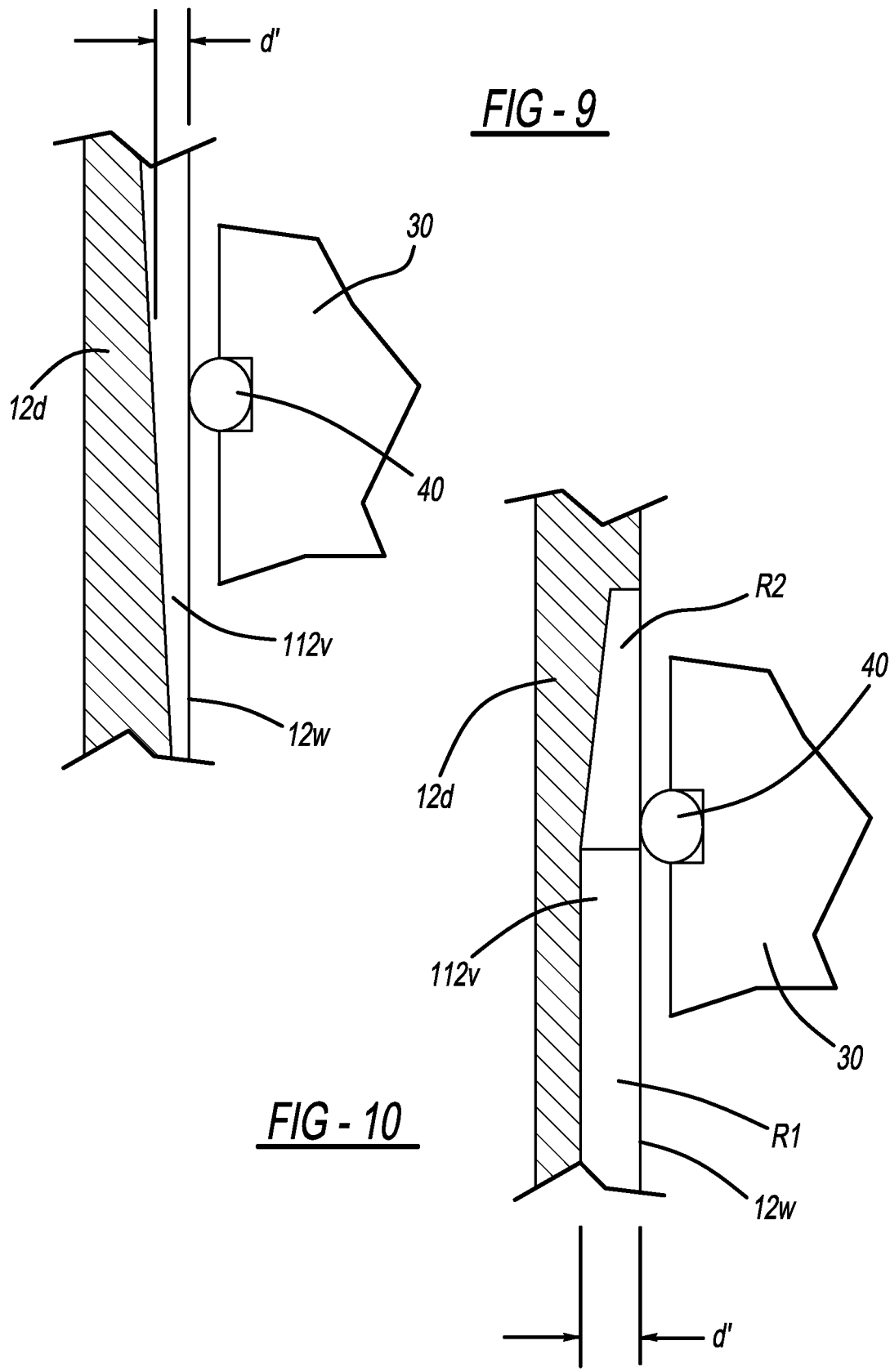

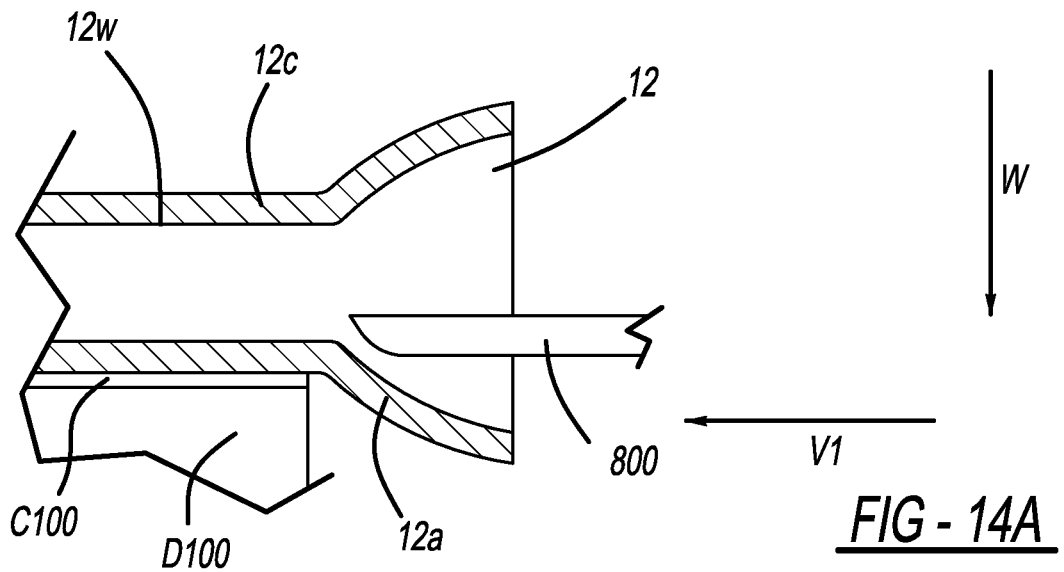
FIG - 14A
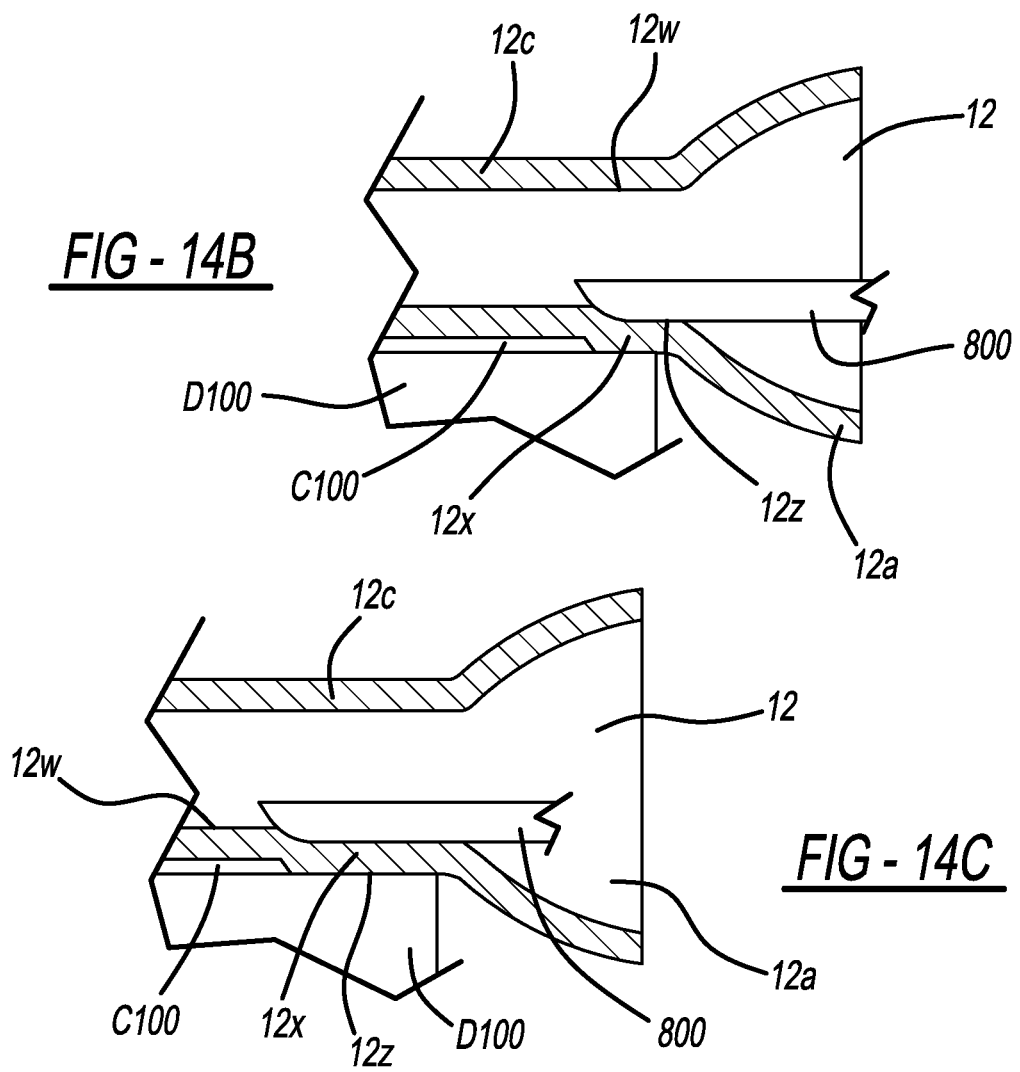
FIG - 14B
FIG - 14C

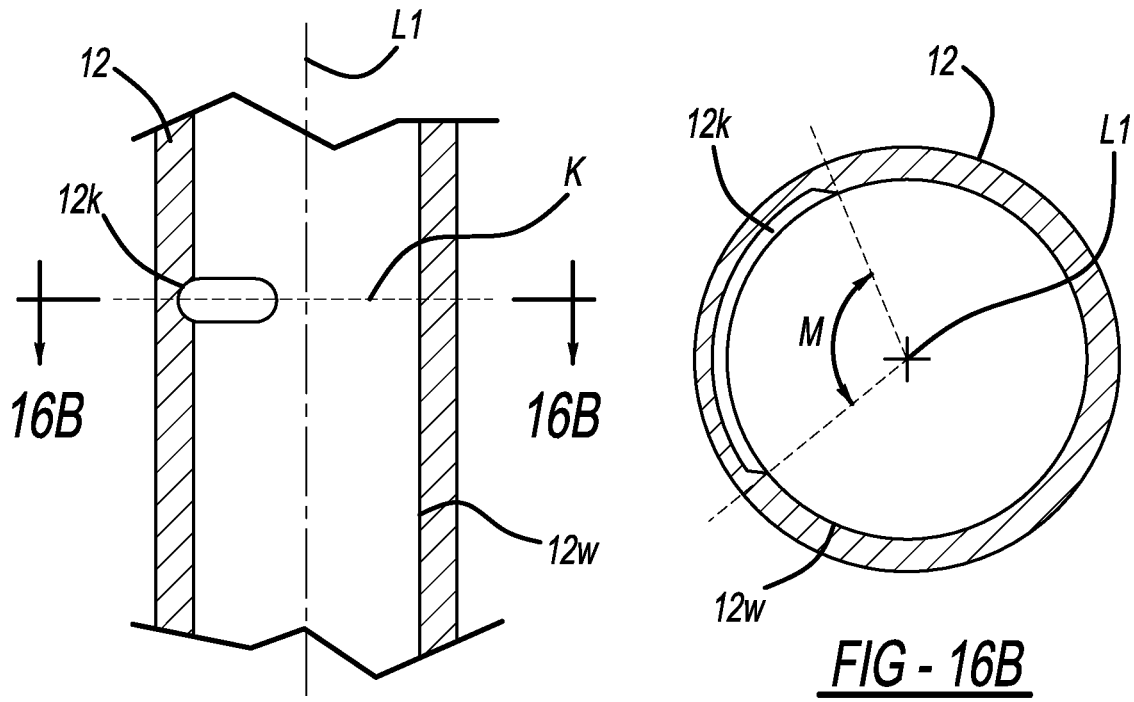
*FIG - 16A*
*FIG - 16B*
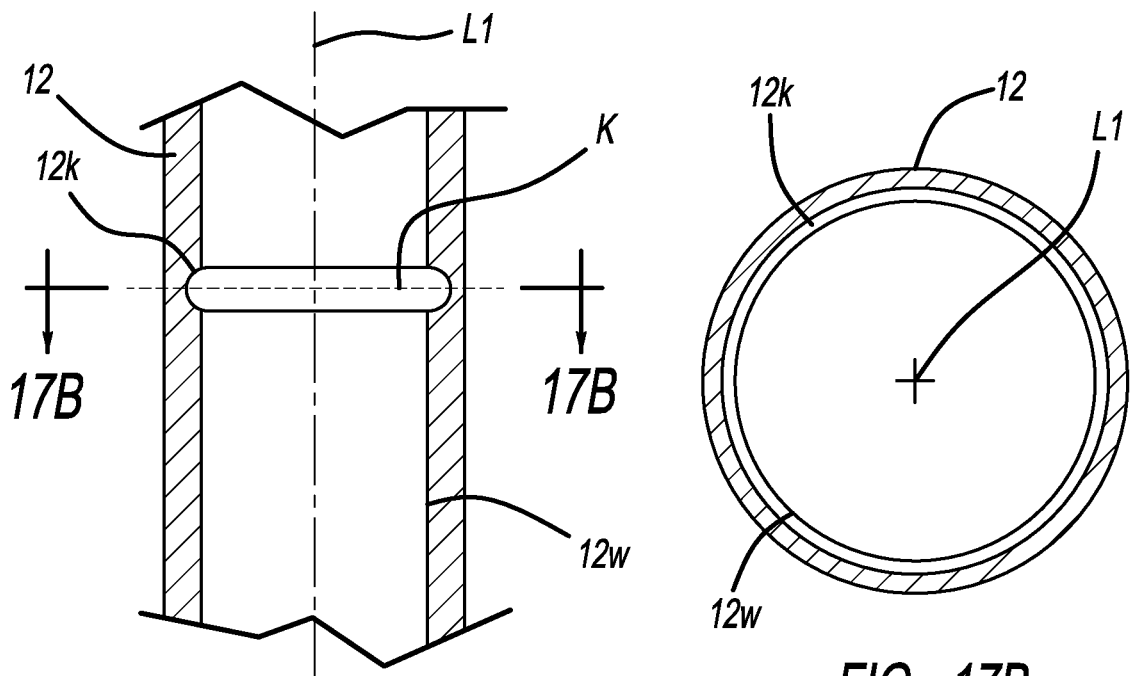
*FIG - 17A*
*FIG - 17B*

VENTED PRESSURIZED GAS-POWERED ACTUATOR

CROSS-REFERENCE TO RELATED APPLICATIONS

This application claims the benefit of U.S. Provisional Application Ser. Nos. 61/832,538, filed on Jun. 7, 2013, and 61/835,515, filed on Jun. 14, 2013, the disclosures of which are incorporated herein by reference in their entireties.

BACKGROUND OF THE INVENTION

The embodiments described herein generally relate to a vented pressurized gas-powered actuator and methods and structured usable for controlling an actuation force profile of the actuator.

Various types of actuators may be used to automatically move certain portions of vehicles. These actuators may be configured to exert a force within a predetermined range, or to move elements or the vehicle a desired distance or along a predetermined path. Some actuator designs utilize a piston and an attached piston rod powered by a pressurized fluid, such as a pressurized gas. It is desirable to be able to control the force exerted by the actuator according to the position of the piston or piston rod during various portions of the piston rod stroke.

SUMMARY OF THE INVENTION

In one aspect of the embodiments described herein, a vented pressurized gas-powered actuator is provided. The actuator includes a housing having a central longitudinal axis and an inner surface. The inner surface has a constant radius between first plane and second planes extending perpendicular to the axis. At least one vent groove extends from the inner surface in a direction away from the axis. The at least one vent groove has a first end intersecting the first plane and a second end intersecting the second plane.

In another aspect of the embodiments of the described herein, a vented pressurized gas-powered actuator housing is provided. The housing includes an inner surface and at least one vent groove extending from the inner surface into the wall.

BRIEF DESCRIPTION OF THE DRAWINGS

FIG. 2 is a cross-sectional side view of the actuator housing shown in FIG. 1.

FIG. 2A is a cross-sectional end view of a housing incorporating a single vent groove as shown in the embodiment of FIGS. 1-2.

FIG. 3 is a cross-sectional end view of the actuator shown in FIG. 1.

FIG. 4A is a schematic view of the actuator housing incorporating the vent groove arrangement shown in FIG. 4.

FIG. 5A is a schematic view of the actuator housing incorporating the vent groove arrangement shown in FIG. 5A.

FIG. 9 is a cross-sectional view of a portion of a housing incorporating an embodiment of a vent groove having a varying cross-sectional area.

FIG. 10 is a cross-sectional view of a portion of a housing incorporating another embodiment of a vent groove having a varying cross-sectional area.

FIGS. 14A-C are cross-sectional schematic views showing one embodiment of the progression of formation of a vent groove in a wall of an actuator housing.

FIG. 16A is a cross-sectional side view of a housing incorporating a vent groove in accordance with another embodiment described herein.

FIG. 16B is a cross-sectional end view of the housing shown in FIG. 16A.

FIG. 17A is a cross-sectional side view of a housing incorporating a vent groove in accordance with another embodiment described herein.

FIG. 17B is a cross-sectional end view of the housing shown in FIG. 17A.

DETAILED DESCRIPTION

Figure 1:
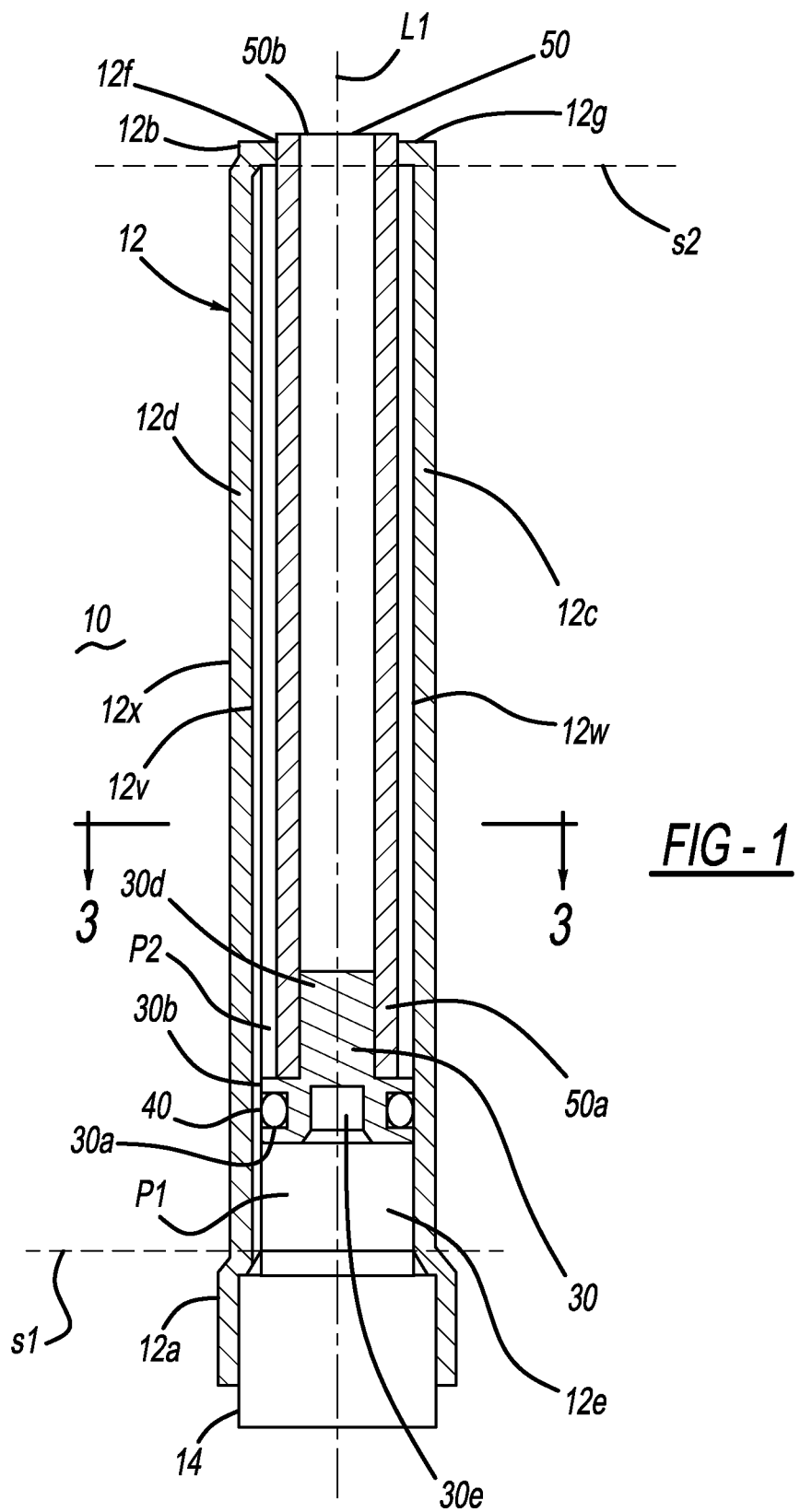
FIG. 1 is a cross-sectional side view of one embodiment of a vented pressurized gas-powered actuator prior to activation of the actuator.

Like reference numerals refer to like parts throughout the description of several views of the drawings. In addition, while target values are recited for the dimensions of the various features described herein, it is understood that these values may vary slightly due to such factors as manufacturing tolerances, and also that such variations are within the contemplated scope of the embodiments described herein.

FIGS. 1-17B show various embodiments of a vented pressurized gas-powered actuator. The actuator 10 may be mounted to any suitable device or mechanism, if desired, and may be operatively coupled (via piston rod 50, described in greater detail, below) to any suitable device or mechanism for transmitting a force to the device or mechanism. The actuation force is generated responsive to the introduction of a pressurized gas into a housing of the actuator, in a manner described below. The pressurized gas may be generated within the housing (for example, by a gas generator incorporated into the housing), or the gas may be introduced into the housing from an external gas source in fluid communication with the housing interior. One possible application for an actuator as described herein is in lifting a portion of a hood of an automotive vehicle.

Any of the elements of any embodiment of an actuator described herein may be formed from any suitable material or materials. For example, housing 12 may be formed from a metallic material (for example, stainless steel), a polymer, or any other suitable material or materials.

In the embodiment shown in FIGS. 1-3, actuator 10 has a housing 12, a piston 30 slidably positioned within the housing, and a piston rod 50 attached to the piston so as to move in conjunction with the piston. In the embodiment shown, housing 12 is cylindrical and has an outermost housing wall 12d defining a first end 12a, a second end 12b and a body 12c connecting the first and second ends. Wall 12d also defines a hollow interior 12e of the housing. In the embodiment shown in FIGS. 1-3, housing first end 12a is flared radially outwardly to accommodate a suitable gas generator 14 (for example, a known micro-gas generator) to be inserted and retained therein by crimping, adhesive attachment, or any other suitable method. Alternatively, the gas generator 14 may be attached to housing first end using a suitable retention method. A gas-emitting portion 14a of the gas generator 14 is positioned within the housing so that generated gases flow into the housing interior 12e after activation of the gas generator. If desired, a suitable seal (such as an epoxy seal, o-ring seal or other sealing means; not shown) may be provided to prevent or minimize leakage of generated gas between the gas generator 14 and the housing 12 to an exterior of the housing.

An interior surface 12w of wall 12d has a constant radius measured from housing central longitudinal axis L1 and is structured to permit sliding engagement of a resilient seal 40 therealong, as described in greater detail below. Seal 40 is mounted on a piston 30. In the embodiments described herein, housing inner surface 12w defines a cylindrical volume, and the vent groove(s) described herein reside outside but adjacent to this cylindrical volume.

In the embodiment shown in FIGS. 1-3, housing second end 12b has an opening 12f structured to receive therethrough a piston rod 50 attached to a piston 30 (described in greater detail below) which is slidably positioned in housing interior 12e. Opening 12f may be sized or otherwise structured to laterally constrain or support to the piston rod 50 as portions of the rod move into and out of the housing through opening 12f. In the particular embodiment shown in FIGS. 1-3, an end wall 12g is formed from a portion of housing 12, and opening 12f is drilled or otherwise formed in the wall 12g.

Figure 1A:
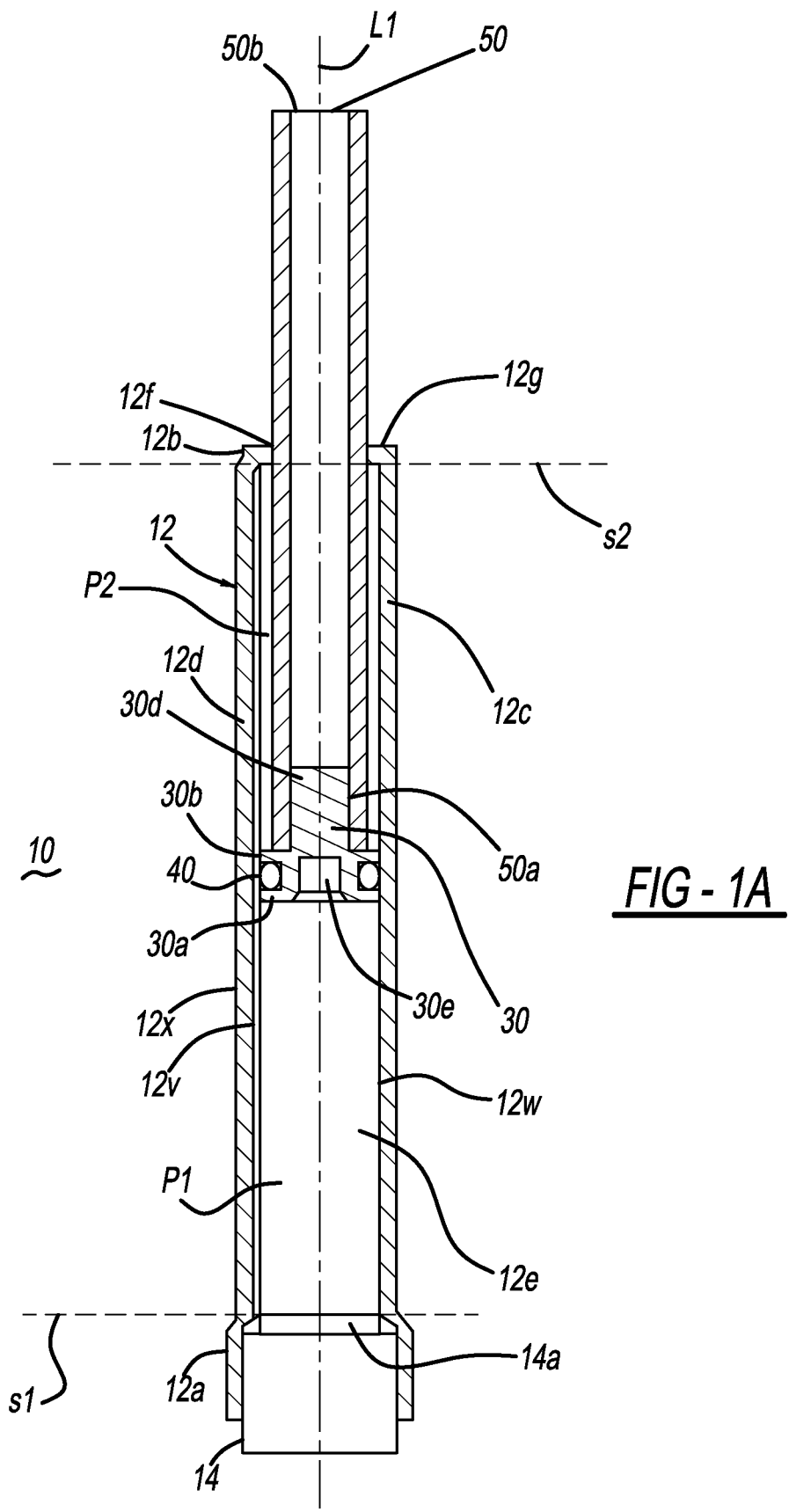
FIG. 1A is the cross-sectional side view of FIG. 1 showing the actuator after activation.

A piston 30 is slidably positioned within housing interior 12e. Referring to FIGS. 1 and 1A, piston 30 has a base 30a with an outer wall 30b. A groove 30c is formed in wall 30b and is structured for receiving therein a resilient gas-tight seal 40 (for example, a suitable O-ring). In a known manner, seal 40 resiliently engages or contacts the interior surface 12w of housing wall 12d, thereby providing a substantially gas-tight seal between the piston 30 and wall 12d. When piston 30 is positioned in housing 12 with seal 40 contacting the housing wall interior surfaces, the region of contact between the seal and the housing wall defines a boundary between a higher pressure side P1 of the piston and a lower pressure side P2 of the piston. Thus, venting will occur through groove(s) 12v (described in greater detail below) as long as gases traveling along the groove(s) can pass under the seal 40 (between the seal and the housing wall) from the higher pressure side P1 to the lower pressure side P2 side of the piston.

In the embodiment shown in FIGS. 1-3, a projection 30d extends from piston base 30a. Projection 30d is structured for engaging (or for suitable attachment to) an associated piston rod 50 in an interference fit, or for otherwise enabling or facilitating attachment of the piston rod 50 to the piston 30.

In a particular embodiment, a cavity 30e is formed in piston base 30a. Cavity 30e provides a void space in the piston which is structured to accommodate therein debris or loosened portions of gas generator 14 (for example, petalled portions of the gas generator) resulting from activation of the gas generator and expulsion of the generated gases), and to confine the initial expansion of the generated gases. This can enable a relatively smaller quantity of gas generant to be used in the gas generator to produce a given effect.

Piston rod 50 is the mechanism through which the actuator force is transmitted to an element (for example, a portion of a hood of a vehicle (shown schematically as element 902 in FIG. 18)) connected to the piston rod. Piston rod 50 has a first end 50a attached to the piston so as to move in conjunction with the piston. A second end 50b opposite the first end may be configured for attachment to an element or mechanism to which the actuator force is to be transmitted. In the embodiment shown in FIGS. 1-3, piston rod 50 is hollow. Alternatively, the piston rod may be solid, or the piston and piston rod may be formed integrally with each other, as a single piece. The piston rod may also have any particular length, diameter, shape and/or other characteristic(s) suitable or necessary for a particular application.

Referring to FIGS. 1-3, at least one vent groove 12v is formed along an inner surface of housing wall 12d. In the embodiment shown in FIGS. 1-3, groove 12v is produced by a forming operation which presses a portion 12x of the wall outwardly so as to stretch or deform an associated portion of the wall. The groove 12v is formed as the stretched portion 12x of the wall 12d is pushed outward. In the embodiments described herein, the vent grooves (with the exception of embodiments of groove 12k shown in FIGS. 19A-20B) extend parallel to housing longitudinal axis L1.

FIGS. 14A-C show the progression of formation of a vent groove 12v starting from an end of housing body portion 12c, using one possible groove formation method. In the embodiment shown, groove 12v is formed from the expanded end 12a of the housing. However, the groove may be formed starting at either end of the housing. In the embodiment shown, a forming tool 800 is shaped so as to produce a groove having a desired shape and dimensions, by displacing the material of the housing wall in the direction indicated by arrow W (in a direction away from the housing central axis and into the housing wall) as the tool is inserted into the housing interior from an end thereof in direction V1. The portion 12z of the displaced housing wall material along the exterior of the housing wall flows in direction W and into a cavity C100 of an associated shaping die D100.

In an alternative method of forming a groove or a portion of a groove, the housing 12 is positioned so that its length extends along and rests on a longitudinal base, with a portion of the housing exterior that will reside opposite the internal groove 12v being positioned over a shaping die cavity (such as cavity C100 described above). A press tool is then inserted into an end of the housing. The press tool has a groove-forming portion shaped to produce a groove or groove portion having a desired shape (including depth and width) and length when the groove forming portion is pressed into the surface of the interior of housing wall 12d. The groove-forming portion of the tool is pressed into the wall 12d in a direction perpendicular to longitudinal axis L1 of the housing 12, thereby forming the groove and deforming a portion of the housing wall outwardly into the shaping die cavity as previously described. Using this method, different portions of the groove can be formed to have different cross-sectional areas along different planes taken through housing 12 perpendicular to axis L1. This enables the cross-sectional area of the portion of the groove through which the gas flows around the piston resilient seal to be controlled at any point along the groove (as seen for example, in FIGS. 10-13).

In another alternative method, groove 12v is formed by a broaching operation performed on the housing wall interior surface. In a known manner, the broaching operation removes a desired amount of material from the wall interior surface, thereby reducing the thickness t of the housing wall opposite the groove.

In another alternative method of forming a groove or a portion of a groove, housing 12 is formed from a suitable polymer. Any of grooves 12v may be formed by one of the methods previously described, or the groove(s) may be formed, for example, by molding an insert fabricated into a desired groove profile shape (for example, one of the groove shapes shown herein) into a wall of the polymeric housing. The insert may then be removed from the groove formed into the housing wall after the molded housing has cooled to a sufficient degree.

Figure 15:
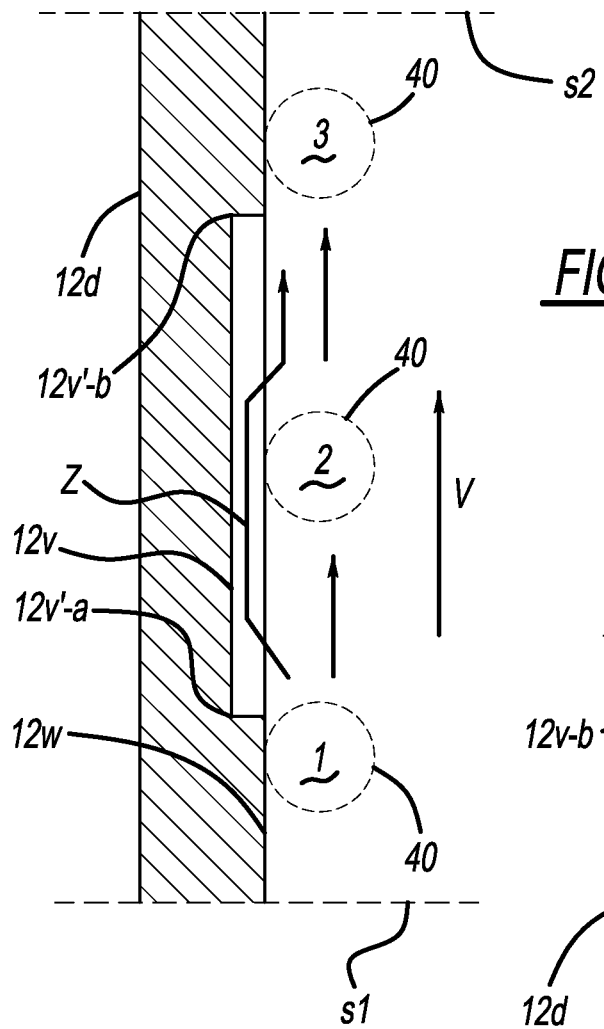
FIG. 15 is a cross-sectional side view of a portion of a housing incorporating an exemplary vent groove, showing the basic principle of operation of the embodiments described herein.

FIG. 15 is a cross-sectional view of a portion of a housing incorporating a vent groove 12v' in accordance with an embodiment described herein, showing the basic principle of operation of the groove. The drawing shows piston-mounted seal 40 progressing in direction V along surface 12w from its pre-activation position, after activation. In position 1, the seal has not yet reached the groove 12v'. Thus gases on higher pressure side P1 are prevented by the seal from reaching the lower pressure side P2 of the piston by contact between the seal and the housing wall inner surface 12w. In position 2, after the seal 40 has passed end 12v'-a of groove 12v', the gases on the P1 side of the piston have a route along the groove and around the seal to the lower pressure side P2 of the piston. The gases continue to flow along the vent groove 12v' as shown by arrow Z, until the seal reaches groove end 12v'-b. In position 3 of the seal, the seal has passed groove end 12v'-b, the groove no longer resides below or outside of the seal. Thus, the gas flow path through the groove is blocked.

Figure 15A:
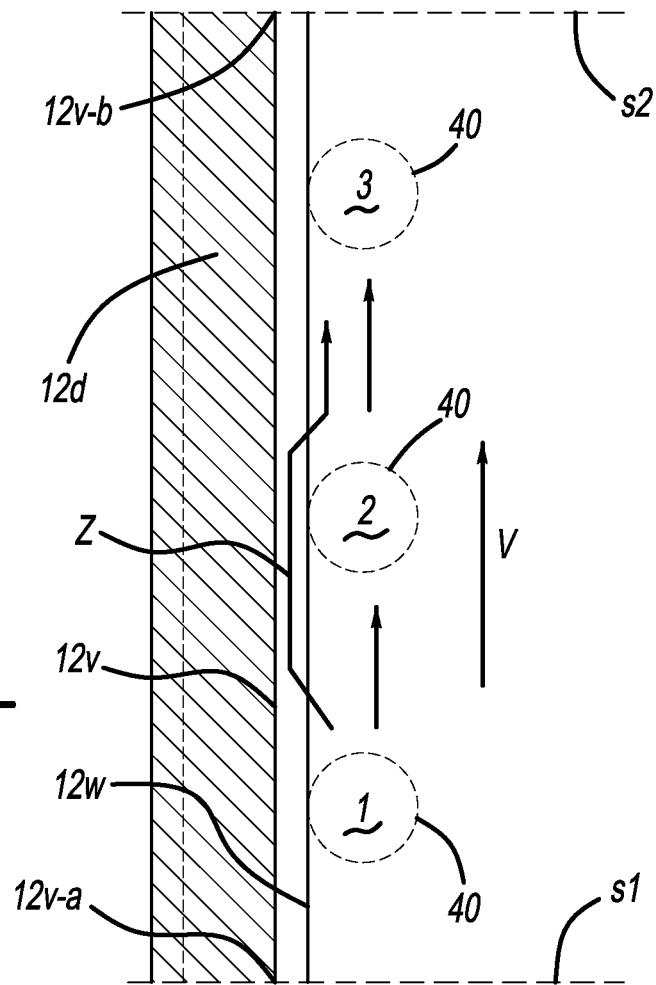
FIG. 15A is a cross-sectional side view showing a portion of a housing incorporating the particular embodiment of the vent groove shown in FIGS. 1-3.

FIG. 15A shows the particular embodiment 12v of a vent groove shown in FIGS. 1-3, which extends along essentially the entire length of the portion of the housing over which inner surface 12w has a constant radius (as described herein). It is seen that, in all of the successive positions of the seal 40, the gases on the P1 side of the piston have a route along the groove and around the seal to the lower pressure side P2 of the piston. Thus, venting occurs along the entire constant radius portion of the housing, from the beginning of the piston stroke to the end of the stroke. The gases continue to flow along the vent groove 12v as shown by arrow Z, until the seal reaches groove end 12v-b. The fluid flow rate along the groove (and thus, the actuator force profile) is controlled by controlling the cross-sectional dimensions of the groove ends and the portions of the groove between the ends. These parameters may be varied at various locations along the groove as described herein, in order to achieve a desired force profile.

The actuator force profile (defined herein as the force exerted by the piston rod 50 on an element connected thereto as a function of time) may be controlled by controlling structural features of the actuator, such as the number of vent grooves, the area of the vent groove(s) (defined for each vent groove as the area bounded by the seal 40 sliding over the groove and the portion of the housing wall 12d defining the edge of the groove at any given cross-section of the housing, shown, for example, as area A in FIG. 2A), the length(s) of the vent grooves, the gas output characteristics of the gas generator, and other pertinent factors. The dimensions of these features can be modified to control such characteristics as the total flow rate of gases along the vent grooves and the amount of time venting is enabled.

In the embodiments described herein, planes s1 and s2 (described below) extend perpendicular to axis L1 and schematically represent the longitudinal ends or limits of the constant radius portions of the housing interior surface 12w along which venting from the higher pressure piston side P1 to the lower pressure side P2 may be enabled by providing vent grooves along the housing. That is, inner surface 12w (except for the portions along the vent grooves) is located at a constant radius from axis L1 between planes s1 and s2. The piston moves in direction V as shown in FIGS. 4A-8, with the piston stroke beginning at or about plane s1 and ending at or about plane s2. Venting occurs along grooves formed into surface 12w.

For example, in the embodiment shown in FIGS. 1-3, as groove 12v extends outside or beyond remainder of the housing wall interior surface 12w, the groove 12v provides a flow path (or vent) for pressurized gases past the seal 40, from the higher pressure side P1 to the lower pressure side P2, when the seal is positioned over the vent groove. Gases flowing along the groove 12v to the lower pressure side of the piston 30 are then free to flow out of the housing through housing opening 12f. Whenever it is desired to enable venting of pressurized gases from a vent groove, the ends of the groove are positioned such that a portion of the groove always extends to both the higher pressure side P1 of the seal 40 and the lower pressure side P2 of the seal.

In the embodiments described herein, the ends of at least one of the vent grooves extend to each end of body portion 12c such that both ends of the groove are open at the housing ends 12a and 12b, at the locations where the groove intersects planes s1 and s2. Thus, the interior of the housing is able to vent to an exterior of the housing along this entire portion of the housing.

For example, in the embodiment shown in FIGS. 1-3, groove 12-v has a first end 12v-a intersecting a first plane s1 extending perpendicular to the axis L1, and a second end 12v-b intersecting a plane s2 extending perpendicular to the axis. Thus, the length L of the groove 12v is specified in relation to the desired stroke length of the piston 30 such that a portion of the groove always extends to both the higher pressure side P1 of the seal 40 and the lower pressure side P2 of the seal. Because the groove 12v extends along the entire stroke length of the piston, a portion of the gases continue to vent throughout the entire stroke of the piston. Thus, in this embodiment, a portion of the generated gases begin venting from the higher-pressure side of the piston to the lower-pressure side of the piston as soon as they are generated.

FIG. 3 shows a plan cross-sectional view of a portion of the actuator housing shown in FIGS. 1 and 2, incorporating a single full-length vent groove 12v as previously described (i.e., a vent groove structured to enable venting for what is essentially the full length of the piston stroke). In other embodiments, multiple vent grooves may be spaced apart along the housing wall interior surface. For example, FIGS. 4, 4A, 5, 5A, 6, 7, and 8 show schematic views of actuator housings having multiple spaced apart grooves, 12v-1, 12v-2 and 12v-3.

Figure 4:
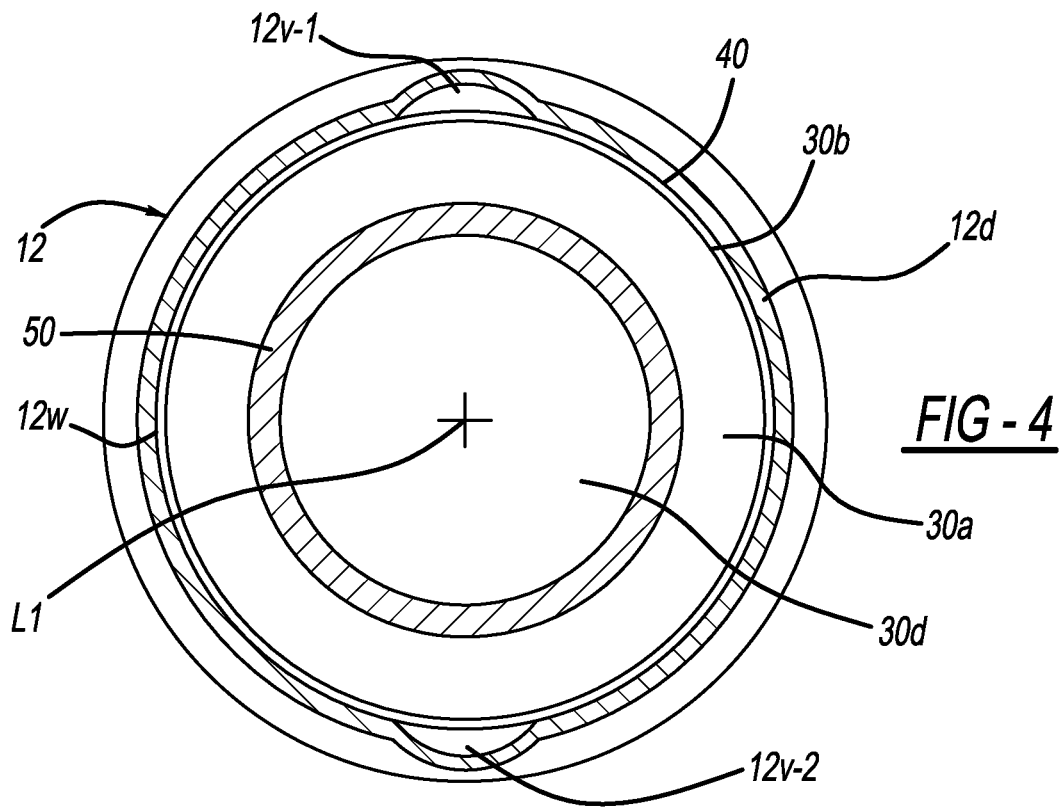
FIG. 4 is a cross-sectional end view of another embodiment of an actuator showing an alternative vent groove arrangement.

FIG. 4 shows a plan cross-sectional view of a portion of an actuator having two diametrically opposed full-length vent grooves 12v-1 and 12-v2. FIG. 4A shows a schematic view of a housing incorporating the vent groove arrangement shown in FIG. 4. In the embodiment shown in FIGS. 4 and 4A, grooves 12v-1 and 12-v2 have equal lengths and are coextensive along the housing (the beginnings 12v-1a and 12v-2a of the grooves are located along a common plane extending perpendicular to the housing longitudinal axis L1, and the ends 12v-1b and 12v-2b of the grooves are located along another common plane extending perpendicular to the housing longitudinal axis L1 and located spaced apart from the first plane).

Figure 5:
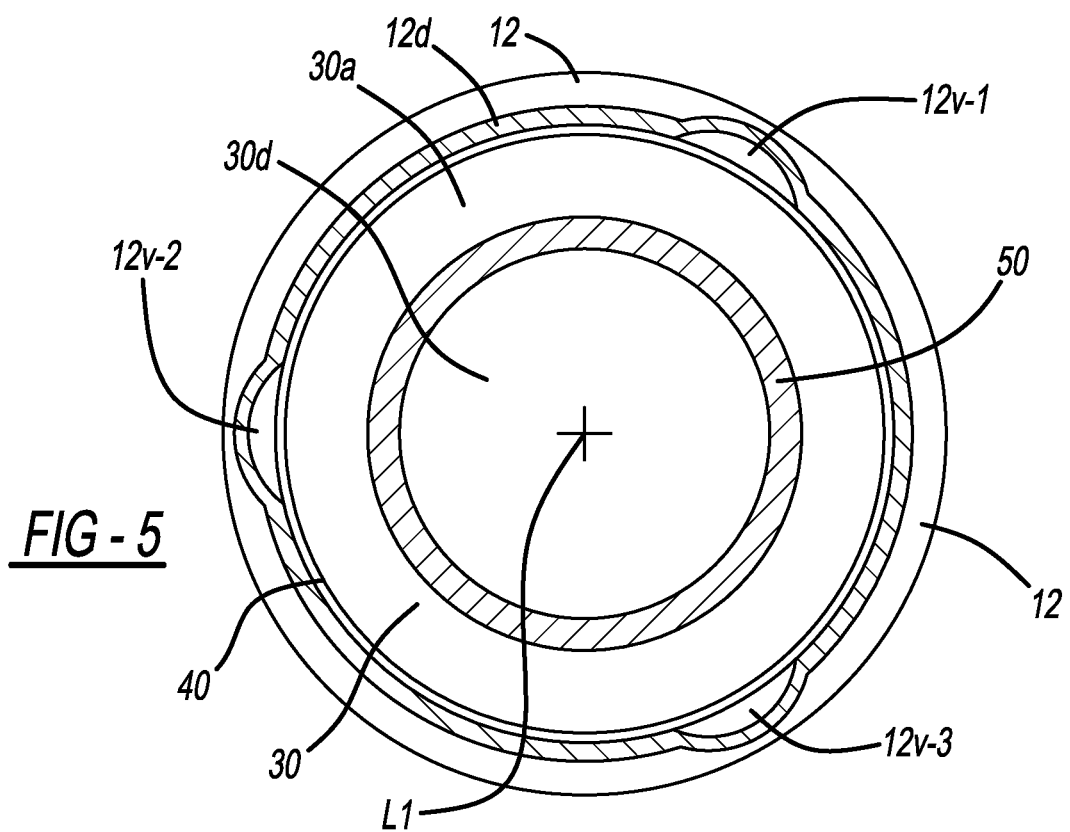
FIG. 5 is a cross-sectional end view of another embodiment of an actuator showing another alternative vent groove arrangement.

FIG. 5 shows a plan cross-sectional view of a portion of an actuator including a housing having three full length vent grooves 12v-1, 12-v2 and 12v-3 equi-angularly spaced about the axis L1 and along the inner surface 12w. FIG. 5A shows a schematic view of a housing incorporating the vent groove arrangement shown in FIG. 5. In the embodiment shown in FIGS. 5 and 5A, grooves 12v-1, 12-v2 and 12v-3 all have equal lengths (extending between respective beginnings 12v-1a, 12v-2a and 12v-3a and respective ends 12v-1b, 12v-2b and 12v-3b) and are coextensive.

Any desired number of vent grooves may be employed. In addition, the angular spacing(s) and/or other distances between pairs of grooves in any set of grooves may be equal or unequal. In addition, the grooves shown in FIGS. 4A and 5A are full length grooves. However, as well as at least one full length groove, an embodiment may include a vent groove that is less than full length (i.e., a vent groove specified such that the venting is enabled along only a portion of the stroke length of the piston. In any such relatively shorter vent groove, flow of a portion of the generated gases along the vent groove and past seal 40 would be enabled only for a portion of the piston stroke corresponding to the length and position of the vent groove, as previously described.

In particular embodiments having at least one relatively shorter vent groove, the positions of the ends of the groove (or grooves) may be specified so as to control the point in the piston stroke at which the onset and end of venting occurs.

Figure 6:
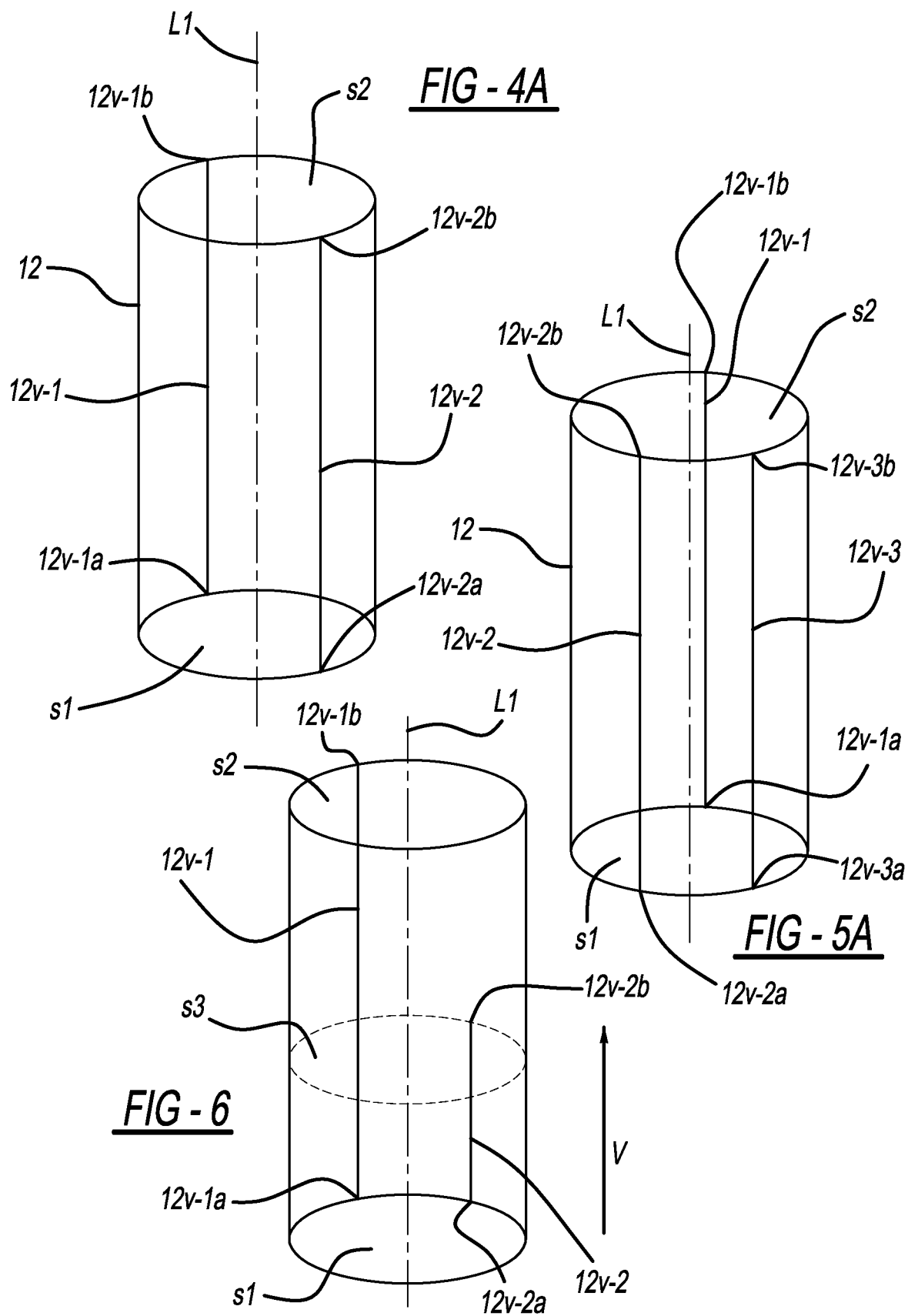
FIG. 6 is a schematic view of another actuator housing embodiment incorporating an alternative vent groove arrangement.

For example, the actuator housing embodiment shown in FIG. 6 includes a first, full length groove 12v-1 and a second groove 12v-2 which enables venting at the start of piston motion (at 12v-2a) and then terminates at 12v-2b (at a plane s3 extending perpendicular to axis L1) before reaching the end of the piston stroke. Thus, venting is enabled through both of grooves 12v-1 and 12v-2 for the length of groove 12v-2. After the piston rises past end 12v-2b of groove 12v-2, venting is enabled only through groove 12v-1.

Figure 7:
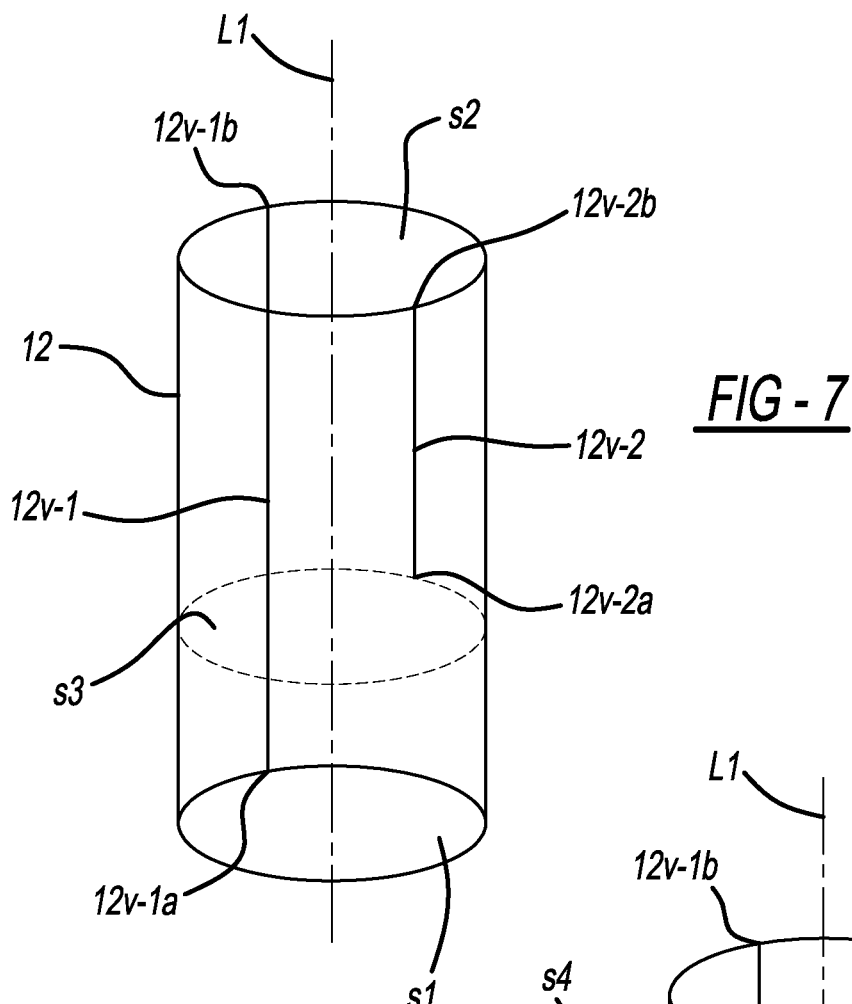
FIG. 7 is a schematic view of another actuator housing embodiment incorporating another alternative vent groove arrangement.

The actuator housing embodiment shown in FIG. 7 includes a first, full length groove 12v-1 which enables venting at the start of the piston stroke (at 12v-1a), and a second groove 12v-2 which enables venting to commence therethrough at a point 12v-2a (along a plane s3 extending perpendicular to axis L1) reached by the piston after travelling a specified distance within the housing. After the piston reaches groove 12v-2 at 12v-2a, venting is enabled through both grooves until the end of the piston stroke.

Figure 8:
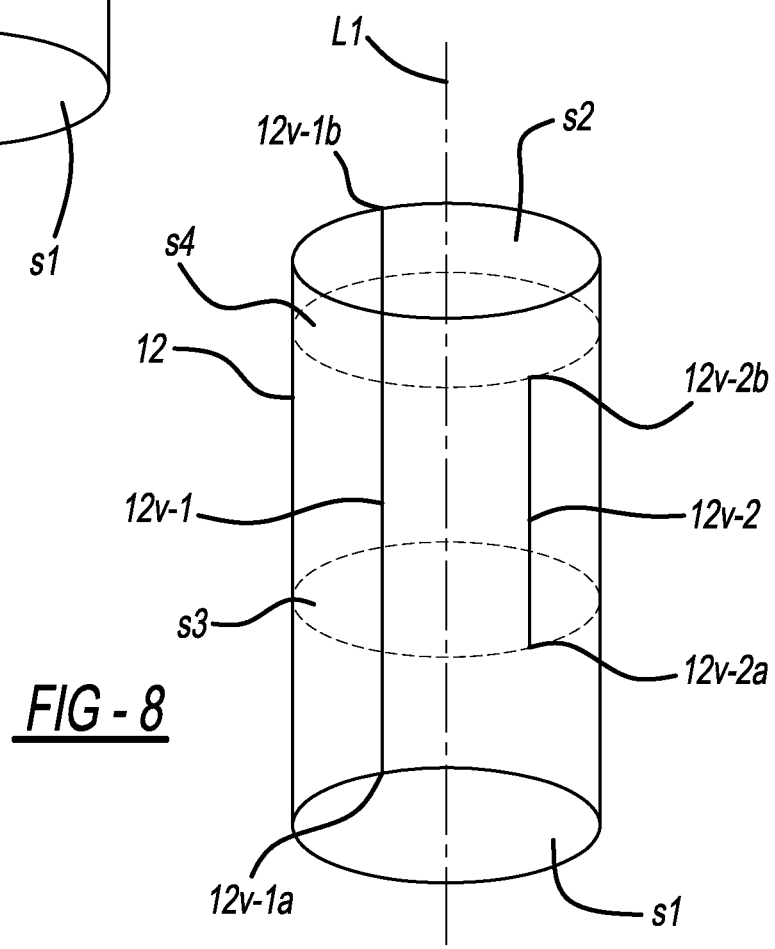
FIG. 8 is a schematic view of another actuator housing embodiment incorporating another alternative vent groove arrangement.

The actuator housing embodiment shown in FIG. 8 includes a first, full length groove 12v-1 which enables venting at the start of the piston stroke (at 12v-1a), and a second groove 12v-2 which enables venting to commence therethrough at a point 12v-2a (located along a plane s3 extending perpendicular to axis L1) reached by the piston after travelling a specified distance within the housing. Venting is then enabled through both grooves until the piston reaches a second point 12v-2b (located along a plane s4 extending perpendicular to axis L1) and along groove 12v-2. After the piston reaches groove 12v-2 at 12v-2b, venting is again only enabled through groove 12v-1.

In the embodiment shown in FIGS. 1-3, groove 12v has a constant cross-sectional area (within the limits of manufacturing tolerances) along its entire length. In any of the embodiments described herein, the grooves (where multiple grooves are incorporated into the housing) may have the same cross-sectional areas or different cross-sectional areas.

In addition, the cross-sectional area of any particular groove may be varied along its length as another means of affecting the actuator force profile. Control of the area through which the gases may flow enables a controlled variation of the gas flow or venting rate as the piston travels along the groove.

For example, in the embodiment shown in FIG. 9, the depth d' of groove 112v varies along the length of the groove. This variation in groove depth d' produces a corresponding variation in groove cross-sectional area along the length of the groove. In the embodiment shown in FIG. 9, the groove 112v is tapered so that the depth d' of the groove varies at a uniform rate along the length of the groove. However the cross-sectional area of the groove can be varied in any desired manner that can be fabricated.

In addition (or alternatively), the forming tool may be formed so as to vary the width of the tool therealong. This enables the width of a groove formed in the housing wall to be correspondingly varied during fabrication of the housing.

In other embodiments, any groove may be formed into adjacent portions or sections into "zones" having different characteristics.

Figure 11:
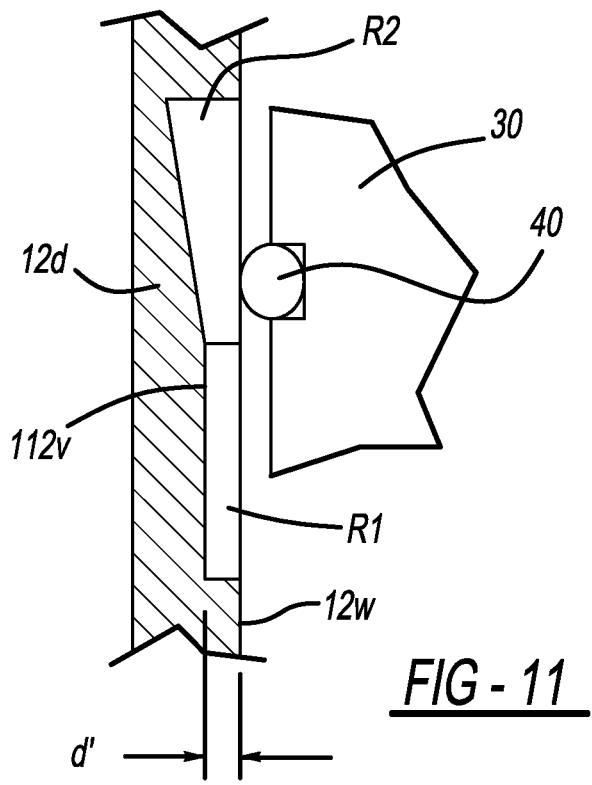
FIG. 11 is a cross-sectional view of a portion of a housing incorporating another embodiment of a vent groove having a varying cross-sectional area.

For example, in the embodiments shown in FIGS. 10 and 11, a first portion R1 of the groove 112v has a constant cross-sectional area, and a second portion R2 of the groove adjacent the first portion has a cross-sectional area which varies along the length of the groove.

Figure 12:
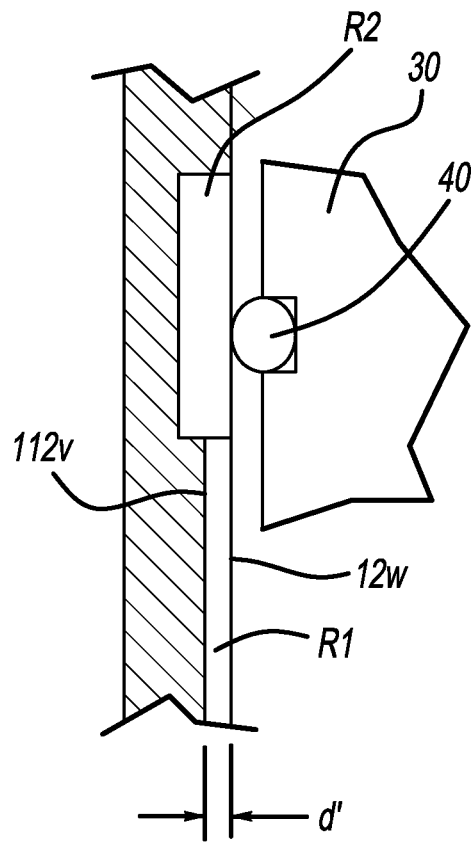
FIG. 12 is a cross-sectional view of a portion of a housing incorporating another embodiment of a vent groove having a varying cross-sectional area.

In the embodiment shown in FIG. 12, a first portion R1 of the groove 112v has a first constant cross-sectional area, and a second portion R2 of the groove adjacent the first portion has a second constant cross-sectional area different from the first cross-sectional area.

Figure 13:
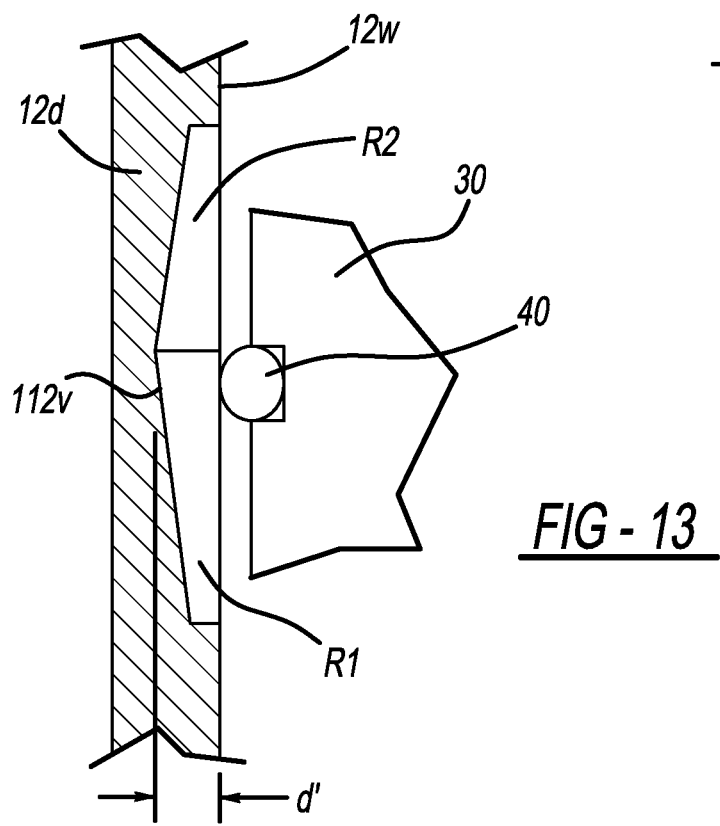
FIG. 13 is a cross-sectional view of a portion of a housing incorporating another embodiment of a vent groove having a varying cross-sectional area.

In the embodiment shown in FIG. 13, a first portion R1 of the groove 112v has a cross-sectional area which varies along the length of the groove, and a second portion R2 of the groove has a cross-sectional area which varies along the length of the groove.

In view of the above, it may be seen that numerous options exist for providing any of a wide variety of actuator force profiles, using the methods and structures described herein.

During operation of the actuator, the gas generator or other pressurized gas source is activated to introduce pressurized gas into the housing on the higher-pressure side P1 of the piston. The pressurized gas forces the piston in direction V, whereby a force is exerted by piston rod 50 on an element or mechanism attached thereto. The actuator force profile will be related to the amount of pressurized gas vented through the groove(s) from the higher pressure side P1 of the piston to the lower pressure side P2. At the end of the piston stroke and/or when the resilient seal has passed the groove(s) and is in flush contact with ungrooved surfaces of the housing wall, the gasses remaining in the higher pressure side can continue to escape from the higher-pressure area to the lower pressure area between the housing wall and the resilient seal until the pressure in the higher-pressure area is nearly equalized with atmospheric pressure. The result is a fully depressurized actuator within seconds of actuator deployment.

Also, in a particular embodiment, prior to activation of the actuator, the piston 30 is positioned such that a portion of at least one vent groove resides on both the higher pressure side P1 (i.e., the gas generator side) and the lower pressure side (i.e., the side of the piston on which the piston rod 50 exits the housing 12) of the resilient seal 40. This enables the housing internal pressures on sides P1 and P2 of the piston to be equalized during assembly of the actuator and prior to actuator activation.

Referring now to FIGS. 16A-17B, in another embodiment 12k of a vent groove, the length of the groove extends along an axis K residing on a plane that is perpendicular to housing axis L1. The cross-sectional dimensions of the groove may be controlled to provide a relatively rapid or "pulsed" release of gas of a desired amount, from high pressure side P1 to lower pressure side P2, as the seal 40 passes over the groove. The groove 12k may extend along 360 degrees of the surface of wall 12w, thereby forming a continuous "ring", as shown in FIGS. 17A and 17B. Alternatively, the groove 12k may extend along only a specific portion or included angular extent M of the surface 12w, as shown in FIGS. 16A and 16B. These variations enable increased flexibility in control of the actuator force profile. The groove 12k may be formed using one of the groove formation methods described herein.

Figure 18:
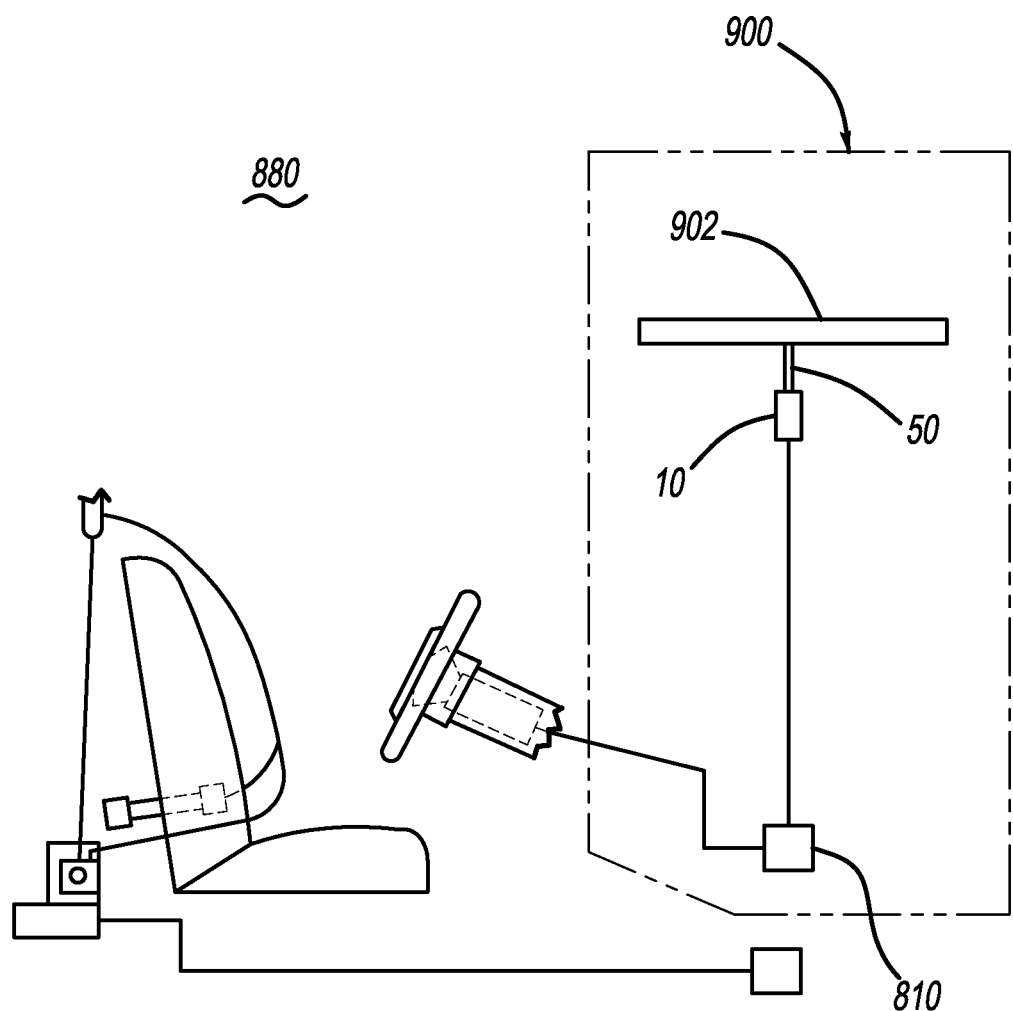
FIG. 18 is a schematic view of a portion of a pedestrian protection system installed in a vehicle and incorporating a hood-lifting device in accordance with an embodiment described herein.

FIG. 18 is a schematic view of a portion of a pedestrian protection system 900 installed in a vehicle 880 and incorporating a hood-lifting device 10 in accordance with an embodiment described herein. In this embodiment of the pedestrian protection system 900, a vehicle mounted sensor 810 detects contact between the vehicle and a pedestrian (not shown). Responsive to this detected contact, an activation signal is sent to the hood-lifting mechanism 10, resulting in activation of the gas generator or otherwise releasing pressurized gases into the interior of housing 12 to produce extension of the piston rod 50 from the housing, as previously described. The extending piston rod 50 then raises the portion of the hood 902. The hood-lifter activation signal may be sent from the sensor 810 or from a suitably-configured controller (not shown) which receives the vehicle-pedestrian contact signal from sensor 810 and generates the activation signal in response thereto.

It will be understood that the foregoing descriptions of the various embodiments are for illustrative purposes only. As such, the various structural and operational features herein disclosed are susceptible to a number of modifications, none of which departs from the scope of the appended claims.

What is claimed is:

1. A vented pressurized gas-powered actuator comprising:
a housing having a central longitudinal axis and an inner surface integrally formed on said housing;
a piston slidably positioned within the housing and engaging the inner surface for traveling a stroke length within the housing along the central longitudinal axis;
at least one vent groove defined by and extending from the inner surface in a direction away from the axis, the at least one vent groove intersecting a first end of the stroke length and a second end of the stroke length, wherein ventilation occurs through the at least one vent groove and directly to the atmosphere as the piston travels the entire stroke length.

2. The actuator of claim 1 further comprising a gas generator, and wherein the piston has a cavity formed therein along a side of the piston facing the gas generator.

3. The actuator of claim 1 further comprising:
a seal operatively coupled to the piston so as to move with the piston and so as to engage the inner surface to form a gas-tight seal therewith,
wherein the actuator is structured so that the seal maintains the gas-tight seal with the inner surface while gas is venting along the at least one vent groove.

4. The actuator of claim 3 further comprising a second vent groove extending from the inner surface in a direction away from the axis, and wherein the actuator is structured so that the seal maintains the gas-tight seal with the inner surface while gas is venting along the second vent groove.

5. The actuator of claim 4 wherein the second vent groove has a first end spaced apart from the first end of the stroke length.

6. The actuator of claim 5 wherein the second vent groove has a second end spaced apart from the second end of the stroke length, and wherein the second vent groove second end is closer to the second end of the stroke length than to the first end of the stroke length.

7. The actuator of claim 5 wherein the second vent groove has a second end intersecting the second end of the stroke length.

8. The actuator of claim 4 further comprising a third vent groove extending from the inner surface in a direction away from the axis, wherein the actuator is structured so that the seal maintains the gas-tight seal with the inner surface while gas is venting along the third vent groove.

9. The actuator of claim 8 wherein the at least one groove, the second vent groove and the third vent groove are equi-angularly spaced about the axis and along the inner surface.

10. The actuator of claim 4 wherein the second vent groove has a first end intersecting the first end of the stroke length and a second end intersecting the second end of the stroke length.

11. The actuator of claim 4 wherein the second vent groove is positioned diametrically opposite the at least one groove.

12. The actuator of claim 4 wherein a longitudinal axis of the second vent groove resides on a plane that is perpendicular to the housing longitudinal axis.

13. A vented pressurized gas-powered actuator comprising:
a housing having a central longitudinal axis and an inner surface integrally formed on said housing;
a piston slidably positioned within the housing and engaging the inner surface for traveling a stroke length within the housing along the central longitudinal axis; and
at least one vent groove defined by and extending from the inner surface in a direction away from the axis, the at least one vent groove having a first end intersecting a first end of the stroke length and a second end intersecting a second end of the stroke length,
wherein the at least one vent groove is structured to vent gas therealong after activation of the actuator and prior to the piston travelling the stroke length of the piston, and wherein the at least one vent groove is structured to vent gas therealong and directly to the atmosphere for the entire stroke length of the piston.

14. A vented pressurized gas-powered actuator comprising:
- a housing having an inner surface integrally formed on said housing and a central axis;
- a gas tight seal movably positioned within and engaged with the inner surface of the housing for traveling a stroke length within the housing along the central axis, the gas tight seal preventing gas from flowing between the seal and the inner surface; and
- at least one vent groove defined by and extending from the inner surface away from the central axis,
- wherein:
  - the at least one vent groove intersects a first end of the stroke length and a second end of the stroke length, and
  - the at least one vent groove is structured to vent gas therealong past the gas tight seal and directly to the atmosphere when the gas tight seal overlies the vent groove.

* * * * *